Aug. 7, 1962   J. N. DE LAURO   3,047,984
STRUCTURAL GRILLE UNIT
Filed May 18, 1959   2 Sheets-Sheet 1
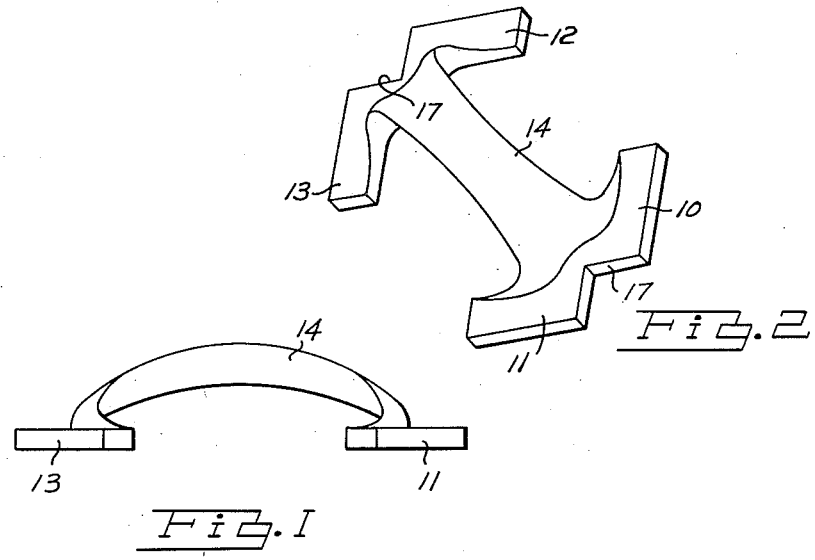
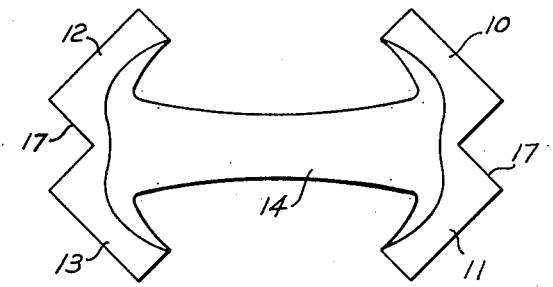
INVENTOR.
JOSEPH N. DE LAURO
ATTORNEYS Aug. 7, 1962   J. N. DE LAURO   3,047,984
STRUCTURAL GRILLE UNIT Filed May 18, 1959   2 Sheets-Sheet 2

INVENTOR.
JOSEPH N. DE LAURO
BY
Donnelly, Mentag & Harrington
ATTORNEYS

United States Patent Office 3,047,984
Patented Aug. 7, 1962

3,047,984
STRUCTURAL GRILLE UNIT
Joseph N. De Lauro, 19992 Strathmore, Detroit, Mich.
Filed May 18, 1959, Ser. No. 813,761
1 Claim. (Cl. 50—262)

My invention relates to a new and useful improvement in a structural symmetrical grille unit adapted for use in forming partitions, walls, supporting columns and the like where it is desired to have a grille formation.

With the present invention, a single unit is provided and this unit is so constructed that it may be arranged to provide various patterns and designs on the structure on which it is used.

It is an object of the present invention to provide a grille unit having a structural shape based on the geometric properties of the square and on the fixed relationship between angles and diagonals.

It is another object of the present invention to provide a grille unit of this class having a pair of feet on each side connected by a bowed connecting member.

It is another object of the present invention to provide a grille unit of this class having a pair of feet at opposite sides and provided with a notch at the outer edge between the feet.

Other objects will appear hereinafter.

It is recognized that various modifications and changes may be made in the detail of the structure illustrated without departing from the invention and it is intended that the present disclosure shall be considered to be but the preferred embodiment.

Forming a part of this application are drawings in which,

FIG. 1 is a side elevational view of the invention,

FIG. 2 is a perspective view of the invention,

FIG. 3 is a top plan view of the invention,

Figure 4:
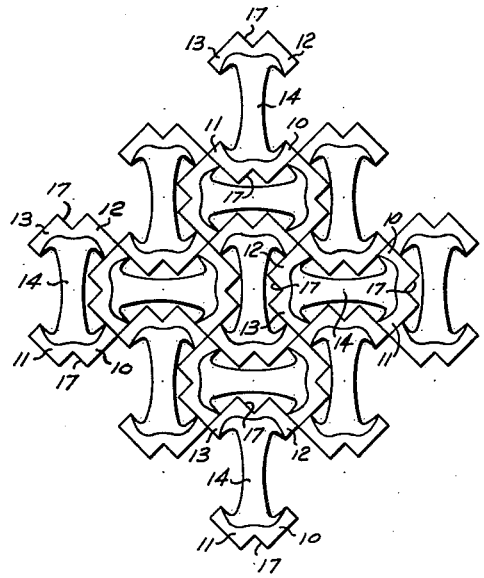
FIG. 4 is a plan view of a certain ornamentation formed by the use of the invention.

As shown in the drawings, the invention comprises a pair of feet 10 and 11 extending angularly to each side and spaced apart at their outer edge with a right angle notch 17. At the opposite end of the structure are similar feet 12 and 13, separated by the triangular notch 17. These two sets of feet or base members are connected by a bow-shaped connecting member 14 which extends between the same. The bow-shaped connecting member 14 is disposed in a vertical plane relative to the two sets of feet and is connected to the two sets of feet at opposite ends of the connecting member. The feet in each set of feet extend laterally, outwardly from said bow-shaped connecting member and the upper and lower faces of the feet are planar. The feet in each set of feet are disposed in a common horizontal plane which is at right angles to the vertical plane of the bow-shaped connecting member and the bow-shaped connecting member extends upwardly in said vertical plane from the horizontal plane of the feet. The triangular notch 17 between the feet in each set of feet is aligned to the median line of the bow-shaped connecting member. The inner ends of the feet of each set of feet on the ends of the bow-shaped connecting member being angularly disposed to the length of each set of feet. In FIG. 4 I have indicated a design or pattern which has been formed by the use of the unit. In forming this pattern or design, the units are secured at the faces of the feet or base members 10 and 11, and 12 and 13 to a suitable supporting body. This supporting body may be a wall, a partition, a column, or other suitable member.

Figure 6:
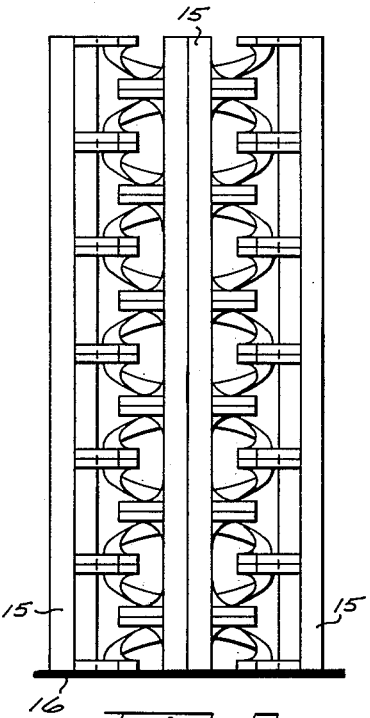
FIG. 6 is a side elevational view of a column in which the invention is used.
Figure 5:
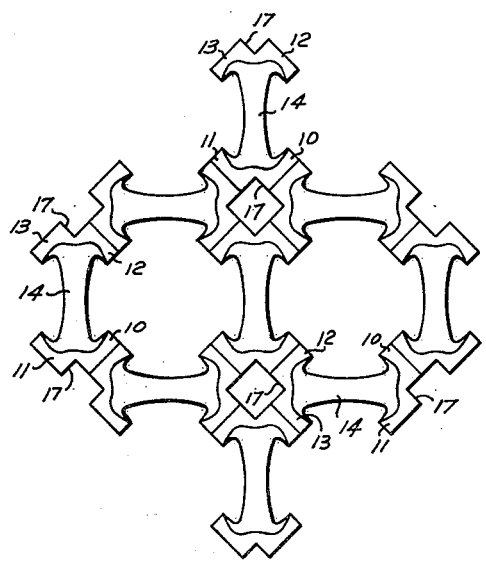
FIG. 5 is a plan view of a different type of ornamentation formed by the use of the invention.
Figure 7:
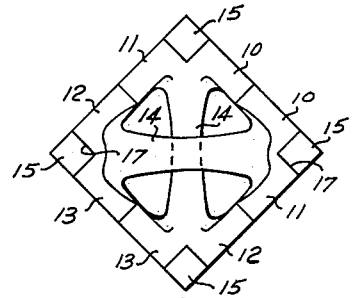
FIG. 7 is a top plan view of the column shown in FIG. 6.

FIG. 5 is a view of a further ornamentation in which a different arrangement by angularly positioning the units is effected. In FIG. 6 I have shown a column having supporting members 15 which extend upwardly from a floor or other suitable supporting body 16. The columns 15 engage in the notch 17 and the units are glued or otherwise suitably secured to the column. In this particular formation proceeding from the bottom, the second unit is inverted relatively to the first, that is, it is turned up-side-down. The next unit above is in an upright position of the faces of the feet and the lower unit engages the faces of the feet of the corresponding foot of the upper unit and these units are secured together at the engaging surfaces of the feet.

FIGS. 4, 5, 6 and 7 have been presented to illustrate some idea of the patterns or designs which may be provided by the use of the unit. Of course, it is recognized that other relative positions of the units may be resorted to to provide different designs or patterns.

These units may be made of various materials such as wood, cement, plastic, ceramic, glass, metals or alloys. The decorative arrangements are obtained by formation in the juxtaposition of the units, and they may also be obtained by the use of a column.

The geometric properties of the basic unit allows the formation of various patterns possessing structural and aesthetic values. Experience has shown that a very aesthetic effect may be obtained. It is believed obvious that the device may be used for decorative fences and grilles as well as a handle.

What I claim is:

A symmetrical grille unit of the class described, comprising: two sets of feet, each set consisting of a pair of feet disposed at right angles to each other; a bow-shaped connecting member disposed in a vertical plane and connecting said sets of feet and connected thereto at opposite ends of said bow-shaped connecting member; said feet extending laterally and inwardly from the ends of said bow-shaped connecting member; the upper and lower faces of said feet being planar; said feet being disposed in a common horizontal plane which is at right angles to the vertical plane of said bow-shaped connecting member; said bow-shaped connecting member extending upwardly in said vertical plane from the horizontal plane of said feet; there being a triangular notch between each pair of feet aligned to the median line of the bow-shaped connecting member; said notch comprising a right angle; and, the inner ends of the feet of each set of feet on the ends of the bow-shaped connecting member being right angularly disposed to the length of each set of feet.

References Cited in the file of this patent

UNITED STATES PATENTS

| D. 43,974 | Weiser | May 6, 1913 |
| 392,277 | Loy | Nov. 6, 1888 |
| 1,806,967 | Dougherty | May 26, 1931 |
| 2,208,080 | Overdorff | July 16, 1940 |

OTHER REFERENCES

Interiors, May 1956, pp. 104, 105, 108, 109.
Industrial Design, December 1958, page 30.